United States Patent [19]
Williams et al.

[11] Patent Number: 5,880,864
[45] Date of Patent: *Mar. 9, 1999

[54] ADVANCED OPTICAL FIBER COMMUNICATIONS NETWORK

[75] Inventors: Larry Williams, Montgomery County; Dave Little, Columbia; Amos Lucas, Baltimore County; William Burton, Montgomery, all of Md.

[73] Assignee: Bell Atlantic network Services, Inc., Arlington, Va.

[*] Notice: The term of this patent shall not extend beyond the expiration date of Pat. No. 5,808,767.

[21] Appl. No.: 656,879

[22] Filed: May 30, 1996

[51] Int. Cl.$^6$ ................................................... H04J 14/02
[52] U.S. Cl. .................... 359/124; 359/118; 359/125; 359/167
[58] Field of Search ................................. 359/115, 118, 359/124, 125, 164, 165, 152, 167

[56] References Cited

U.S. PATENT DOCUMENTS

| | | | |
|---|---|---|---|
| 4,135,302 | 1/1979 | Kronman et al. | 32/57 |
| 4,506,387 | 3/1985 | Walter | 455/612 |
| 4,709,418 | 11/1987 | Fox et al. | 455/612 |
| 4,763,317 | 8/1988 | Lehman et al. | 370/58 |
| 4,768,188 | 8/1988 | Barnhart et al. | . |
| 4,891,694 | 1/1990 | Way | 358/86 |
| 4,994,909 | 2/1991 | Graves et al. | 358/86 |
| 5,121,244 | 6/1992 | Takasaki | 359/161 |
| 5,133,079 | 7/1992 | Ballantyne et al. | 455/4.1 |
| 5,136,411 | 8/1992 | Paik et al. | 359/125 |
| 5,175,639 | 12/1992 | Takasaki | 359/118 |
| 5,181,106 | 1/1993 | Sutherland | 358/86 |
| 5,189,673 | 2/1993 | Burton et al. | 370/110.1 |
| 5,221,983 | 6/1993 | Wagner | 359/125 |
| 5,262,883 | 11/1993 | Pidgeon | 359/125 |
| 5,272,556 | 12/1993 | Faulkner et al. | 359/125 |
| 5,293,376 | 3/1994 | White | 370/54 |
| 5,303,229 | 4/1994 | Withers et al. | 370/58.1 |
| 5,325,223 | 6/1994 | Bears | 359/137 |
| 5,436,748 | 7/1995 | Vinel et al. | . |
| 5,469,283 | 11/1995 | Vinel et al. | . |
| 5,526,350 | 6/1996 | Gittins et al. | . |

*Primary Examiner*—Rafeal Bacares
*Attorney, Agent, or Firm*—McDermott, Will & Emery

[57] ABSTRACT

An advanced optical fiber communications network comprises a multimode optical fiber connection (one fiber or two) from a central office to an intelligent interface device in the subscriber's premises. The central office includes at least a narrowband switch and a broadband switch. The narrowband switch provides voice grade telephone service routing. The broadband switch provides routing for video services and may comprise an ATM switch, an optical switch or the like. The intelligent interface device provides a connection to the optical fiber and performs two-way wavelength division multiplexing and demultiplexing as well as any necessary signal format conversions. The network has media access control functionality and utilizes a dynamic media access control procedure. The optical fiber loop to the subscriber's premises has the capacity to carry at least three different wavelengths. Bandwidth on the optical fiber loop is dynamically allocated to individual services on demand, and the allocation of bandwidth includes wavelength selection as well as bit rate allocation.

28 Claims, 7 Drawing Sheets

ADVANCED OPTICAL FIBER COMMUNICATIONS NETWORK

CROSS REFERENCE TO RELATED APPLICATIONS

This application describes an invention which is related to applicants' commonly assigned U.S. patent application Ser. No. 08/656,880, filed May 30, 1996.

Field of the Invention

This invention relates generally to the distribution of information and communications services via an optical fiber network. In particular, the invention relates to the control of wavelength division multiplexing in optical fiber connections of a network in order to more efficiently and cost-effectively distribute information.

Background of the Invention

The distribution of high bandwidth information, such as video, is frequently carried out over so-called hybrid fiber/coaxial (HFC) systems. These systems generally distribute the high bandwidth information in one direction only. The fiber optics are connected to the head end of the system at the information source and transport a large number of individual signals or channels over the majority of the distance between the head end and the user locations. The fiber optics usually terminate at a point relatively close to a user location or group of user locations and are transported over coaxial cables from the termination point to the user location or group of user locations.

A typical video signal distribution system for distributing TV programs from a central location is depicted in U.S. Pat. No. 4,994,909 to Graves et al. In that system, the televsision signals are transmitted by fiber optic connections to an interface network 30 and are transmitted by coaxial cables from there to a number of television receivers.

Many of the HFC systems are referred to as fiber to the curb systems. See, for example, U.S. Pat. No. 5,262,883 to Pidgeon and U.S. Pat. No. 5,133,079 to Ballantyne et al. Such systems typically use an optical-to-electrical converting terminal at the curb, sometimes referred to as an optical network unit (ONU), and deliver voice and video downstream to the home from the terminal using coaxial cable or twisted copper pair technology. U.S. Pat. Nos. 5,181,106, 5,189,673 and 5,303,229, commonly assigned to Alcatel Systems, discuss a network having a telecommunications central office connected to remote terminals by fiber optics with the connections to the customers over twisted pair (narrowband) and coaxial cable (broadband). POTS decoding and D/A conversion take place at the ONU and the digital signals limited to video information are decoded and D/A converted at the set top in the CPE.

The installation of ONUs and other active electronic units outside the premises (on telephone poles, electric curbside units, etc.) in fiber to the curb systems is labor and cost intensive and exposes them to inclement weather. The installation of electronic units outside the premises to provide conversion to wire transport also erases the advantage of additional security provided by the extreme difficulty in tapping fiber optics. Even those fiber optic systems having fiber optic drops from the curb to the home, such as in U.S. Pat. No. 5,325,223 to Bears, convert the optical signals to electrical signals at the curb units for the purpose of multiplexing and demultiplexing.

Typical fiber to the curb systems also are not efficient from the network side or the customer side in their use of bandwidth over the fiber, thus ultimately increasing the cost of the system. From the network perspective, the systems do not use bandwidth in an effective way. They also tend to be very rigid and to follow standard North American digital hierarchies or vendor proprietary hierarchies. Such interfaces also tend to be very channelized and to switch large chunks of bandwidth in a discrete type manner regardless of the customer's actual bandwidth needs. The upstream transmission is usually restricted to signalling messages, and the upstream transmission rate back into the network from the customer is extremely bandwidth limited and is not truly dynamic.

Any switching of signals or bandwidth typically occurs at the headend with a point to point transmission system from the headend to the ONU located close to the end user. The optical fiber or fiber optic pair to the ONU carries a very high bandwidth rate which is then subdivided into smaller bandwidths for each one of a plurality of customer premises. For example, the full bandwidth on the fiber may be OC-12, and that bandwidth may be subdivided into 8 different segments, each segment transporting information for one premises over coaxial cable or twisted copper pairs to that premises. See for example, copending, commonly assigned, patent application Ser. No. 08/413,215 filed on Mar. 28, 1995 entitled "Full Service Network with Distributed Architecture".

For video and POTS, all of the switching usually occurs at the headend with channelized transmission and access back through the active electronics at the ONU or elsewhere in the network. For example, in U.S. Pat. No. 5,136,411 to Paik et al, electrical service request signals from subscribers are converted into optical service request signals and sent to a headend terminal. The headend terminal then selects among a number of channels for transmission to the subscribers. In U.S. Pat. No. 4,506,387 to Walter and U.S. Pat. No. 4,709,418 to Fox et al, users can send an upstream request for a selected video program to be delivered downstream at a high rate over fiber optics to a receiving unit at the user's location where the video signals are then displayed. While channels or video programs can be selected, there is nevertheless no dynamic relationship in the allocation of fiber optic bandwidth between the headend and the customer.

From the customer side, the restricted upstream transmission prevents customers connected to fiber to the curb systems from being able to generate signals on the network for two-way transmission in a manner analogous to home page providers on the Internet. It would be preferable to have a system which enables a customer to send as well as receive, for example, full motion video to and from another location and which facilitates transmission of the content and routing signals.

Distribution systems which utilize optical fibers for the entire transmission path to the home are known but are generally regarded as being substantially more expensive and less flexible than HFC or fiber to the curb systems.

U.S. Pat. No. 4,891,694 to Way pertains to a fiber optic cable television distribution system in which each customer location is connected to a remote terminal via a dedicated optical fiber. Television signals are transmitted by optical fiber to a remote terminal and into CATV tuners. An optical fiber connects the remote terminal to the customer location, however the remote terminal is not the interface to the home.

U.S. Pat. No. 5,272,556 to Faulkner et al pertains to distributing HDTV signals from a transmitter at a head station to a number of receivers located at customer stations along an optical network.

U.S. Pat. No. 4,135,302 to Cutler pertains to a broadcasting system in which a signal path between a central station and a plurality of subscribers includes fiber optic transmission lines. The optical fibers extend over the whole length of the transmission paths between an electro-optical transducer at the central station and a distribution point or photosensitive detector of each of the plurality of subscribers.

Although these optical fiber systems are capable of delivering a large amount of information, they nevertheless offer little flexibility in switching between multiple channels or services.

Some fiber optic systems utilizing wavelength division multiplexing and providing telephone, data and video services are known in the prior art. For example, U.S. Pat. Nos. 5,121,244 and 5,175,639 to Takasaki suggest a fiber optic system having auxiliary fiber optic transmission lines for use when upgrading to higher bandwidth services. Although the fiber optic lines may be wavelength division multiplexed, the multiplexers and demultiplexers at both ends merely switch the entire bandwidth output of each fiber optic line. There is no provision made for altering or allocating different customer bandwidths over a single fiber optic line. Takasaki, for example, suggests providing auxiliary transmission lines for flexibility in providing high bandwidth services.

U.S. Pat. No. 5,221,983 to Wagner also discusses a fiber to the home system utilizing wavelength division multiplexing. A central office is connected to a plurality of remote nodes by a fiber. Each node connects to a subscriber premises via another fiber. The central office contains wave-division multiplexing modules, and their output is connected by fibers to the remote node.

U.S. Pat. No. 4,763,317 to Lehman et al discusses a communication network structured to carry both wideband and narrowband communications via optical fibers to the home. Examples of the various services that the network provides include telephony, audio, telemetry, packet-switched interactive data, facsimile, one-way video (TV), restricted one-way video (video-on-demand) and video conferencing. Network interface equipment at the subscribers' premises connects to remote network nodes via distribution optical fibers. Each distribution optical fiber is wavelength-division multiplexed and carries modulated (pulse-analog, pulse-code, or differential pulse-code) wideband digital channels as well as a multiplexed channel comprising 32 time-division-multiplexed narrowband digital channels. One of the narrowband channels carries all signaling messages.

Each remote node in the Lehman et al system comprises a digital space-division switch for wideband channels, and a digital time-division switch for narrowband channels. All switches are controlled by a central node control complex over a control bus and its extensions. Signaling messages are transferred between the signaling-message-carrying narrowband channels and the central node complex by a subscriber signaling subsystem, via the narrowband switch and the control bus. The central node optionally includes interfaces to other communication systems, as well as trunk communication fiber connections Channel Interoffice Signaling (CCIS) fiber connections to other central nodes of the network. The central node in FIG. 2 has fibers that transmit to the remote nodes, and the remote nodes have fiber connections to vasious subscribers.

Lehman et al is limited in flexibility because it utilizes a predefined static channelization on the loop fiber. If the service or bandwidth requirements of a subscriber change quickly, there is no means for establishing various connections through allocated bandwidth on the fiber(s) between the home and the central office. In particular, there is no means provided which make it possible to dynamically allocate bandwidth on the fiber distribution loops on demand.

Completely fiber optic systems such as the one in Lehman et al have limited or no built-in functionality for dynamic access control by the subscriber. Thus, there is no functionality that would allow a subscriber served by a fiber optic system to, for example, request, receive and pay for only the bandwidth which he desire.

Furthermore, completely fiber optic systems are usually limited to a specific service content such as either a fiber video system or a fiber POTS system. There is a need for an interface which can multiplex/demultiplex as required whatever fiber optic signal is sent, thus enabling more transparent access to different information sources with different bandwidth requirements.

BRIEF SUMMARY OF THE INVENTION

It is an object of the present invention to provide methods and apparatus which will overcome the problems and disadvantages of known fiber optic networks and will meet the needs discussed above.

It is an object of the present invention to deliver many different services to the customer using a single fiber optic network.

It is also an object of the invention to use fiber transport from a central office to an interface type device located within the customer premises.

It is a further object of the present invention to deliver service signals over a fiber transport, using various network identifiers that take the service signals through encoding technology such as ATM, to intelligent network interfaces at the customer premises which optically receive those service signals and deliver them to electrical devices in the customer premises.

It is also an object of the present invention to provide a fiber optic system having a dynamic bandwidth interface with the fiber at the point of end use having true dynamic bandwidth for whatever service is subscribed to or for whatever customer access is required.

It is a further object of the present invention is to provide an intelligent interface inside the customer premises and to provide multi-service distribution inside the customer premises, including dynamic distribution between or within services.

A preferred embodiment of the invention provides an optical fiber connection (one fiber or two) from a central office to an intelligent interface device in the subscriber's premises. The central office includes at least a narrowband switch and a broadband switch. The narrowband switch provides voice grade telephone service routing. The broadband switch provides routing for video services and may comprise an Asynchronous Transfer Mode (ATM) switch, an optical switch or the like. Preferably, the central office also includes a packet data switch.

At the subscriber premises, the intelligent interface device provides the connection to the optical fiber and performs two-way multiplexing and demultiplexing as well as any necessary signal format conversions. The intelligent interface device may also provide similar two-way optical to electrical conversion and interfacing for ISDN, telemetry, packet data, etc. Traditional media (twisted pair, coaxial cable, etc.) may be used inside the customer premises for the delivery of the various services.

The intelligent interface device in the subscriber premises also provides a broadband connection. The broadband link within the customer premises may take the form of an optical network, or the on-premises broadband distribution may rely on wireless transmissions. The on-premises optical network may take the form of a bus, with an optical drop type splitter for each terminal device (e.g., 10% dropped to the terminal device, 90% passed downstream to other devices). Alternatively, the interface may include equal division splitters to provide separate links serving individual terminal devices.

The intelligent interface device is thus analagous to an electrical distribution panel, in that the interface device distributes demultiplexed signals throughout the house. If multiple RF signals are delivered, they are converted and modulated at the interface. In this regard, the interface device basically performs the functionality analogous to an optical network unit (ONU) and/or a network interface module (NIM) in a terminal, except now at a central point in the home.

The intelligent interface device preferably receives power from the AC power grid in the subscriber's premises. Alteratively, the interface device may receive power from the central office via a twisted wire pair, e.g. the old telephone loop replaced by the installation of the optical fiber loop.

The interface may also control any alarming, power monitoring or other utility monitoring. The interface and media access control communication with the central office and allow total control of the optical fiber bandwidth allocation to each service. The customer may carry out any desired or necessary communications processing at the interface rather than at a settop box for a TV or VCR. For example, at the interface, conversion functions could be made to, for example, get picture in picture, watch and tape television programs at the same time, watch television and receive data, etc.

The central office includes a similar interface device connected to the subscriber's optical loop. The interface device in the central office provides two-way conversion between optical and electrical signals and perform the multiplexing and demultiplexing of the signals carried on the loop. The central office interface couples the various signals on the loop to and from the voice grade narrowband switch, the broadband switch and the packet data switch, as needed.

The network has media access control functionality and utilizes a dynamic media access control procedure. Bandwidth on the optical fiber loop is dynamically allocated to individual services on demand. The optical fiber(s) can carry three different wavelengths, and allocation of bandwidth can include wavelength selection as well as bit rate allocation.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE PREFERRED EMBODIMENTS

Figure 1:
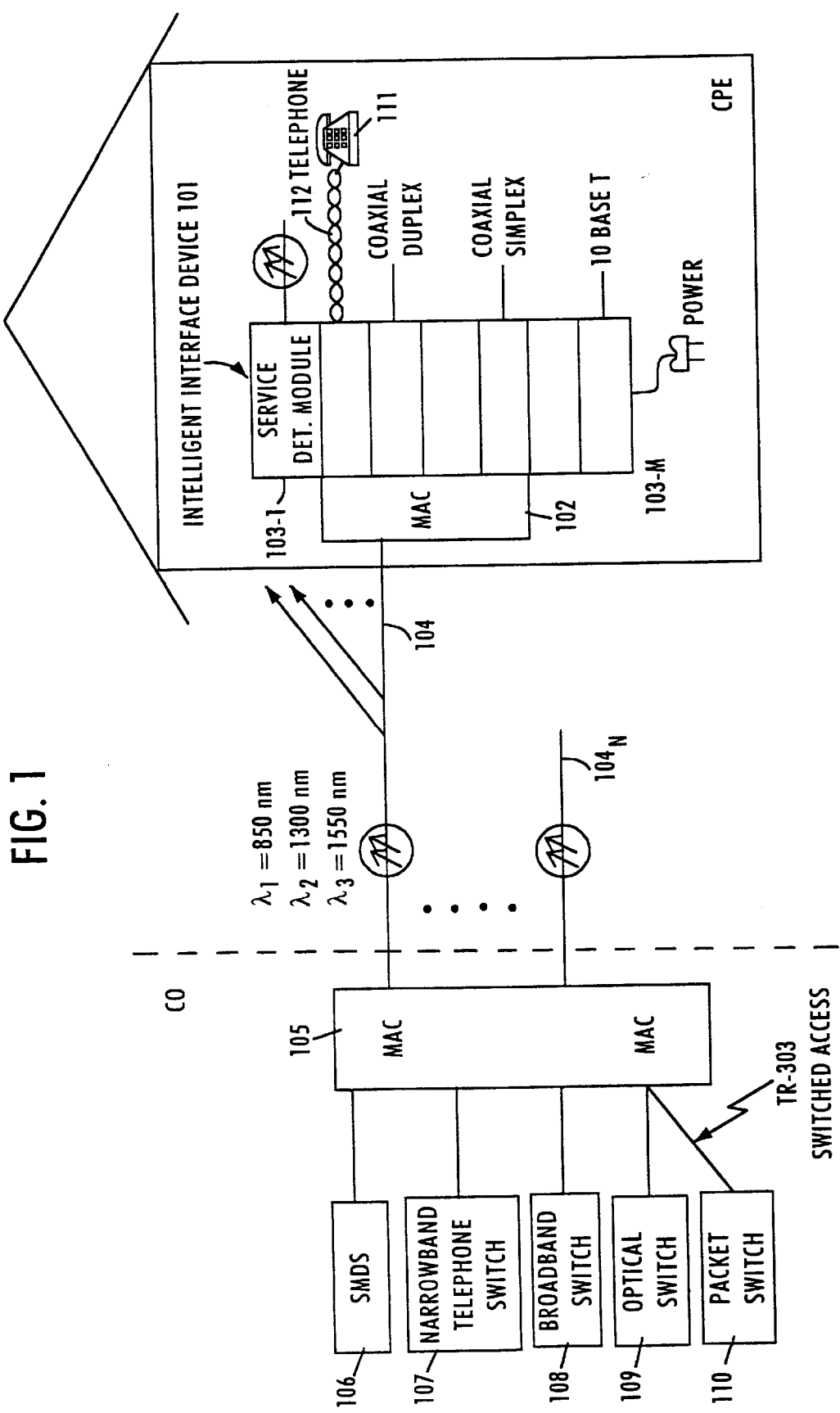
FIG. 1 is a simplified diagram of an illustrative embodiment of an optical fiber-to-the-home network in accordance with the invention in which wavelength division multiplexed information is transmitted to a customer premises.

An exemplary fiber optics network having dynamic bandwidth allocation according to the invention is illustrated in FIG. 1. The Intelligent Interface Device (IID) 101 is one element of the customer premises equipment (CPE). Although illustrated simply as an optical fiber from a telecommunications central office (CO) to the CPE in FIG. 1, it should be understood that the fiber optic transmission path 104 may be composed of any number of duplex fibers or any plurality of simplex fibers, including a fiber optic bundle. It should also be understood that FIG. 1 is a simplified illustration of a network and that the fiber optic network may be of any configuration and may be extremely complicated.

The IID 101 contains a media access controller (MAC) 102, connected directly to fiber optic transmission path 104, which converts input optical signals from fiber optic transmission path 104 to electrical signals and converts electrical signals to optical signals.

A similar media access controller 105 on the network side preferably connects to a plurality of fiber optic transmission paths, 104 to $104_N$, each one of which is connected to any number of different customer premises, 1 to M. In an embodiment having multiple customer premises locations, passive optical splitters and couplers (not shown) are preferably used to optically distribute all of the signals on a single fiber optic transmission path. Each fiber optic transmission path 104 to $104_N$, is preferably full duplex with two logical paths.

The serving node, preferably a telephone central office, comprises media access controller 105 and any number and variety of switched inputs providing communications and information signals. The network shown in FIG. 1 includes a Switched Multi-Megabit Data Services (SMDS) network input 106, a narrowband telephone switch 107, a broadband switch 108, an optical switch 109, and a data packet switch 110. The media access controller 105 receives four input rails, each having a different service through one of the switches or network connections, and selectively couples each one to a different wavelength transmitted on the fiber optic transmission paths 104 to $104_N$.

Regardless of the network architecture or other characteristics, the transmission path over the fiber optic medium 104 is dynamically managed, and the bandwidth is dynamically allocated on a regular basis, by media access controller 105 at the network side and each one of media access controllers 102 to $102_M$ on the subscriber side. Preferably, the management and allocation of bandwidth is carried out by a control link from one of the media access controllers 102 at the customer premises back to the CO, and control information is provided to the media access controllers to dynamically manage the channelization and assign bandwidth.

INTELLIGENT INTERFACE DEVICE

An important feature of the fiber optics network of the invention is the intelligent interface device (IID) 101, preferably comprising a full duplex media access controller (MAC) 102 and one or more customer interfaces, located at the customer premises. The IID 101 is connected to at least one network fiber optic through MAC 102 and to any number of different media in the customer premises through appropriate customer interfaces.

The MAC 102 contains an optical receiver which receives light from fiber optic transmission path 104 and then converts it directly into corresponding electrical signals. An optical transmitter converts electrical input signals to light transmitted directly into fiber optic transmission path 104. MAC 102 and its optical receiver and transmitter are permanent components of the intelligent interface device.

The customer interfaces preferably comprise a number of respective service definition modules, 103 to 103-M, such as those available from Broadband Technologies (BBT) for use with their FLX fiber-to-the curb systems. The modules are not permanent. Each of these modules can be individually loaded into the IID between MAC 102 and the customer interface, replaced, upgraded by the customer as desired, etc. Description thereof is provided in the Executive Overview of the FLX System, Section BBT-200-901, Planning and Engineering, Issue 2.3X, October 1992, pp. 3–28, which is hereby incorporated in its entirety by reference. The service definition may provide conventional services. For example, a telephone service module would comprise circuitry for all of the necessary BORSCHT (battery, overvoltage, ringing, supervision, coding, hybrid and test) functionality to provide normal telephone line service to standard customer premises telephones connected to the interface via a twisted wire pair. An ISDN module would comprise the structure and functions of an ISDN PC card, such as the CyberSpace Freedom™ series of ISDN cards available from ISDN*tek.

However, the modules 103 to 103-M in the preferred embodiment of the invention are not limited to the functions of conventional network communications interfaces. They can support a number of different higher level functions and perform other functions such as decoding of the image compression scheme for full motion video proposed by the Motion Picture Experts Group (MPEG), image processing, etc. For example, a digital video service module would perform the functions of a set-top box and, in particular, a digital entertainment terminal (DET). The architecture and functional details of an exemplary DET can be found in commonly assigned copending U.S. patent application Ser. No. 08/380,755 filed on Jan. 31, 1995 and entitled "Digital Entertainment Terminal with Channel Mapping" or commonly assigned copending U.S. patent application Ser. No. 08/498,265 filed on Jul. 3, 1995 and entitled "Downloading Operating System Software through a Broadcast Channel", both of which are hereby incorporated by reference in their entirety.

Although the service definition modules 103 to 103-M are preferred, the IID 101 can also include network interface module (NIM) and/or processing circuits, such as a MPEG decoder, for receiving broadcast or video-on-demand services. The modules also support a variety of other communications services, such as telemetry meter reading, energy saving, remote control, etc. The modules support a plurality of different physical CPE media such as ISDN, rf coaxial cable, digital coaxial cable, local fiber optics, twisted copper wire pairs. In order to facilitate routing, the customer interfaces may include, or be connected to, optical combining networks so that the optical signals can be bused around the CPE analogous to electrical signals in copper wires.

The IID 101 can be provided with a number of interfaces generally designed according to the needs of the user. FIGS. 8A, 8B and 8C show three different optical transceivers. FIG. 7A is for residential uses and contains a low speed SONET terminal multiplexer which takes the OC-12 two-way and provides a two-way split down to a DS1 internal interface. Standardized service definition module cards provide an RJ-11 jack for conventional telephone service, an ISDN external interface and an ATM data is made available on twisted copper wire pair for interactive video, etc. FIG. 8B is designed for small business and is the same as the residential transceiver in FIG. 8A except with the addition of a high capacity DS-3 output that segregates it in one or more high cap services. FIG. 8C is designed for large business and would have a high capacity OC-3C optical interface and an SMDS interface. These interfaces can go into a Private Branch Exchange (PBX).

Figure 2:
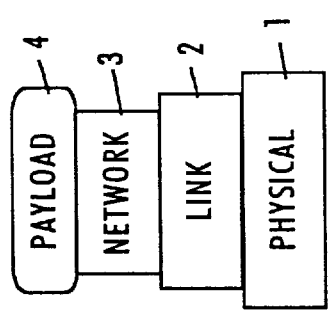
FIG. 2 is a four layer stack diagram, useful in explaining the functions performed by the elements comprising the fiber optic network shown in FIG. 1.

The logical functions of the IID can best be understood by reference to the four layer diagram shown in FIG. 2. The layers 1–4 in FIG. 2 are not actual elements or functions. Bottom layer 1 in FIG. 2 is the physical layer and is comprised of the medium and the terminating connectors for the medium, for example, a twisted copper telephone wire pair and associated RJ-11 jacks. The MAC described above is a level 1 device, it converts the optical signals into electrical signals and vice versa.

The next layer, layer 2, is referred to as the data link layer and is the logic that directly controls the physical layer and is comprised of, for example, the input electrical control signals for the optical transmitter, either digital or analog. This layer performs the wavelength multiplexing and demultiplexing functions of IID 101 by selectively controlling the optical transmitter and receiver of the MAC 102.

Figure 3:
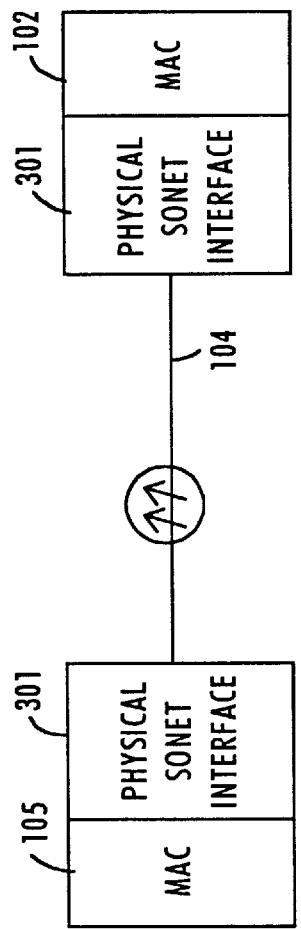
FIG. 3 is a simplified block diagram of matching fiber optic interfaces used in the network shown in FIG. 1.

The next higher layer, network protocol layer 3, accomplishes the signalling, switching and connection of services to create the network. Although shown as a single layer in FIG. 3, it is the most complicated of the layers and may be composed of several sub-layers. It includes, for example, communications protocols and discrete switch layers for disparate services such as Ethernet Local Area Network (LAN), FM, Switched Mega-bit Data Services (SMDS), frame relay, etc. It also includes Level 1 gateways for interactive video and SS7 networks for setting up connections across virtual switches for narrowband services.

Layer 4 rides on top of all of these other layer and constitutes the actual data being communicated from one party to another on the network. The payload, such as a video signal, can exist and remains the same in different network set-ups corresponding to layer 3 (ATM or SONET), different physical links comprising layer 2 (wavelength division multiplexing or time division multiplexing), and different physical medium in layer 1 (either fiber optic, electrical wire, wireless transmission, etc.).

Layers 1–4 represent different levels of complexity in which there can be alternative implementations. For example, video can be transported over either coaxial cable or fiber optics (different physical layer). The signals can be wavelength division multiplexed or time division multiplexed on the physical medium. The multiplexing can occur in an ATM network or a SONET network.

In large fiber optic networks, most of the expense occurs when increasing the maximum bandwidth of the equipment and installation corresponding to physical layer 1. Cost effective advantages can be achieved by effectively using the bandwidth through optimum development of the equipment, protocols and programmed logic corresponding to layers 2 and 3, in particular, the switching of different bandwidth services and services operating differently at the upper level, network level 3. Current fiber optic systems typically handle level 3 operations by a number of discrete switches, each corresponding to a respective service such as Ethernet LAN, FM, SMDS, frame relay, etc., which are located exclusively in the central office. Such level 3 operations are handled or controlled, at least in part, by switches and other equipment within the intelligent interface device of the preferred embodiments.

Media access controller 102 of IID 101 shown in the preferred embodiment of FIG. 1 contains an interface between physical layer 1 and the higher layers and carries out level 1 functions. It channels optical and electrical signals of varying bit rates and formats to and from the physical medium.

The downstream optical signals can be broken down into individual electrical bits, frames or packets, which are output to be decoded in level 3 by the service definition modules 103 to 103-M of the IID 101, and then delivered to the electrical devices in the CPE and converted to physical layer 4 output. For example, the optical signals can represent MPEG encoded video, which then can be converted to electrical signals and decoded by an MPEG decoder into a baseband video signal in a service definition module and then delivered to a television set and converted to a displayed image.

In the preferred embodiment shown in FIG. 1, fiber optic transmission path 104 is preferably a single multi-fiber optical pipe and media access controllers 102 and 105 carry out wavelength division multiplexing and time division multiplexing of the signals transported on the pipe. Spatial division is also carried out by passively splitting the different fibers of the pipe and terminating them at different customer premises.

The wavelength division multiplexing is carried out to the maximum extent safely permitted by the physical properties of the fiber optics. Presently available equipment is capable of effectively operating in three separate wavelength regions: 850 nm, 1300 nm, and 1550 nm. Each wavelength region can support many separate discrete wavelengths. For example, in the 1300 nm region, there is a 1290 nm wavelength signal, a 1300 nm wavelength signal and a 1310 nm wavelength signal. The increments of permissible wavelength divisions and the amount of loss or dispersion vary in the different wavelength regions. For example, the 1550 nm region has the lowest loss, but the 1300 nm region has the best dispersion characteristics.

Of course, there may be more than the three specific wavelength regions mentioned above, and each wavelength region may have wavelength divisions controlled down to the 10ths or hundreds or thousands of Angstroms. In such a case, a larger number of wavelength multiplexed signals are available for simultaneous use.

Figure 4:
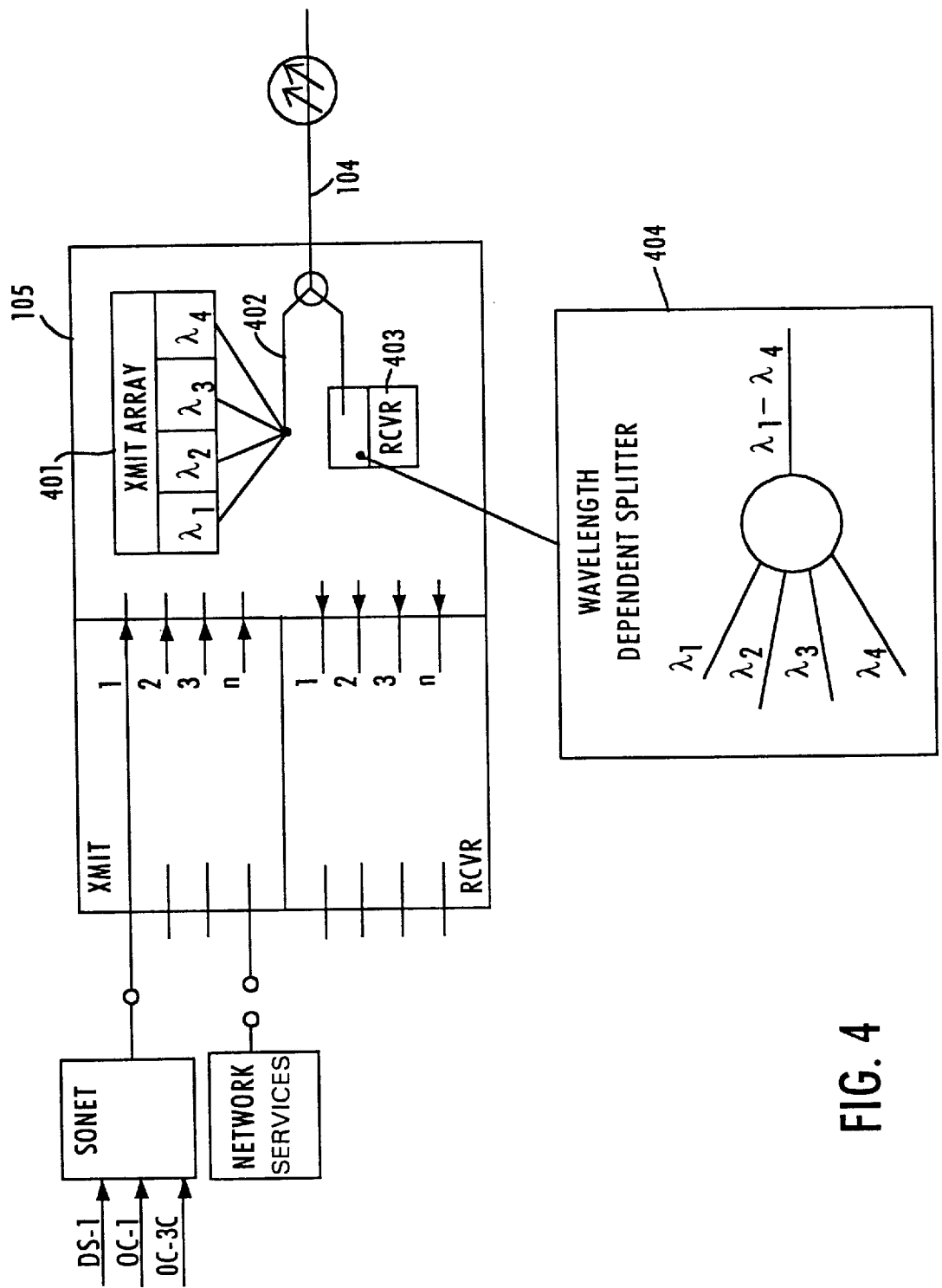
FIG. 4 is an illustrative block diagram of a media access controller used in the network shown in FIG. 1.

FIG. 4 shows a preferred embodiment of media access controller 105. A separate laser is used for each wavelength. The lasers can each be on separate semiconductor chips, but the optical transmitter in the preferred embodiment is comprised of a single integrated (IC) chip 401. The IC 401 has an array of 4, 8 or 16 lasers, each one of which produces pulses at a different wavelength within a common wavelength region. The lasers are not variable or tunable, but the transmitting wavelength(s) are selectable.

The illustration of the laser array constituting the optical transmitter in FIG. 4 is functional. The physical light pulses produced by the lasers on IC 401 are actually coupled by integrated optics and supplied directly into a single fiber 402 so that the light is already wave division multiplexed when it is input into the fiber. The bandwidth of the combined output of the four lasers is in the 10–50 Gb/ps range using presently available commercial equipment. If even more bandwidth or multiplexing is necessary, two laser array ICs may be used with an optical combiner/coupler to feed the output of both into one optical fiber.

All of the lasers operating in a single wavelength region are preferably made from a common substrate (for example, indium phosphate for lasers in the 1300 nm wavelength region) so that the relative difference in wavelength between the lasers is very stable. For example, if there is an increase in temperature of an IC which causes the wavelength of a 1300 nm laser to increase to 1304 nm, the output of a 1310 nm wavelength laser on the same chip will similarly increase to approximately 1314 nm. Therefore, the difference between the output wavelengths will stay approximately constant at 10 nm and will not decrease to 6 nm. The wavelengths consequently always have guardbands to prevent intermodulation.

The semiconductor lasers operating at discrete wavelengths within different wavelength regions are fabricated on different semiconductor chips, each chip corresponding to one of the wavelength regions. The outputs of each chip are then combined in an optical combiner/coupler onto the fiber. However, if fabrication technologies develop to the point where lasers operating at wavelengths of different wavelength regions can be placed on the same substrate, then a single chip can be used.

The optical receiver 403 has to be able to selectively receive and detect each one of the wavelengths on fiber optic 104. Receiver 403 could be controlled so that the light from fiber optic 104 goes to a detector that is only sensitive to the desired wavelength. However, it is preferable for optical receiver 403 to receive all of the different wavelengths on the fiber 104, selectably and optically split the wavelengths and send each wavelength to a separate detector in wavelength dependent splitter 404. Each one of the separate detectors is generally comprised of a broadband detector, such as an avalanche diode, which has a relatively flat sensitivity response for all of the wavelengths on fiber 104.

The IID 101 interacts with the central office in a dynamic media access control procedure to decide the allocation of wavelengths and bandwidths to customers for each call or service at required bit rates. In particular, the dynamic bandwidth assignment can be carried out intra-session at the customer's request. For example, when a customer on his or her computer connected to an information service through the network desires to transmit or receive a large amount of large bandwidth data such as video, he can request that the bandwidth to his premises be substantially increased. If the customer has an optical customer interface on his or her IID and an optical card in the computer, the bandwidth can be increased up to the bandwidth of the fiber coming into the premises.

When bandwidth allocation is employed using wavelength division multiplexing (WDM), a large bandwidth, completely fiber optic system becomes much more economically feasible. The physical interfaces necessary for fiber optic transmission of 2 gigabits per second (2Gb/s) over a single wavelength (optical transmitter, fiber optic and optical receiver) are very expensive. It is cheaper to use, for example, four sets of 500 Mb/s interface equipment for four separate wavelengths on the fiber.

In addition to generating and reproducing light in different wavelength bands as described above, the media access controllers 102 and 105 also controllably perform the modulation and demodulation of the light on a selectable basis. They carry out coherent transmission and subcarrier modulation of the fiber, with ample consideration given in order to prevent beats from occuring between wavelengths. The use of N wavelengths in an optical fiber generally multiplies the bandwidth of the fiber by a factor of N. The number N which is practically obtainable is restricted by the physical properties of either the transmitter, the fiber optic or the receiver. The number may increase with improvements in one or all of these elements, but the distinguishing characteristics of this invention will remain for all values of N.

Distribution of Optical Signals to Interface

Because of the cost associated with the physical transceivers necessary to convert the optical signals of very high bandwidths to electrical signals and vice versa, wavelength division multiplexing creates a cheaper transmission path for distribution than time division multiplexing in fiber optic networks. The large savings achieved at the physical layer, layer 1 in FIG. 3, more than compensates for the complexity introduced into layers 2 and 3. The different wavelengths may be used for different services or for different customer premises. Separation of wavelengths for each customer provides security in the distribution of information because one customer premises does not receive the information selectively distributed to another customer premises.

Figure 5:
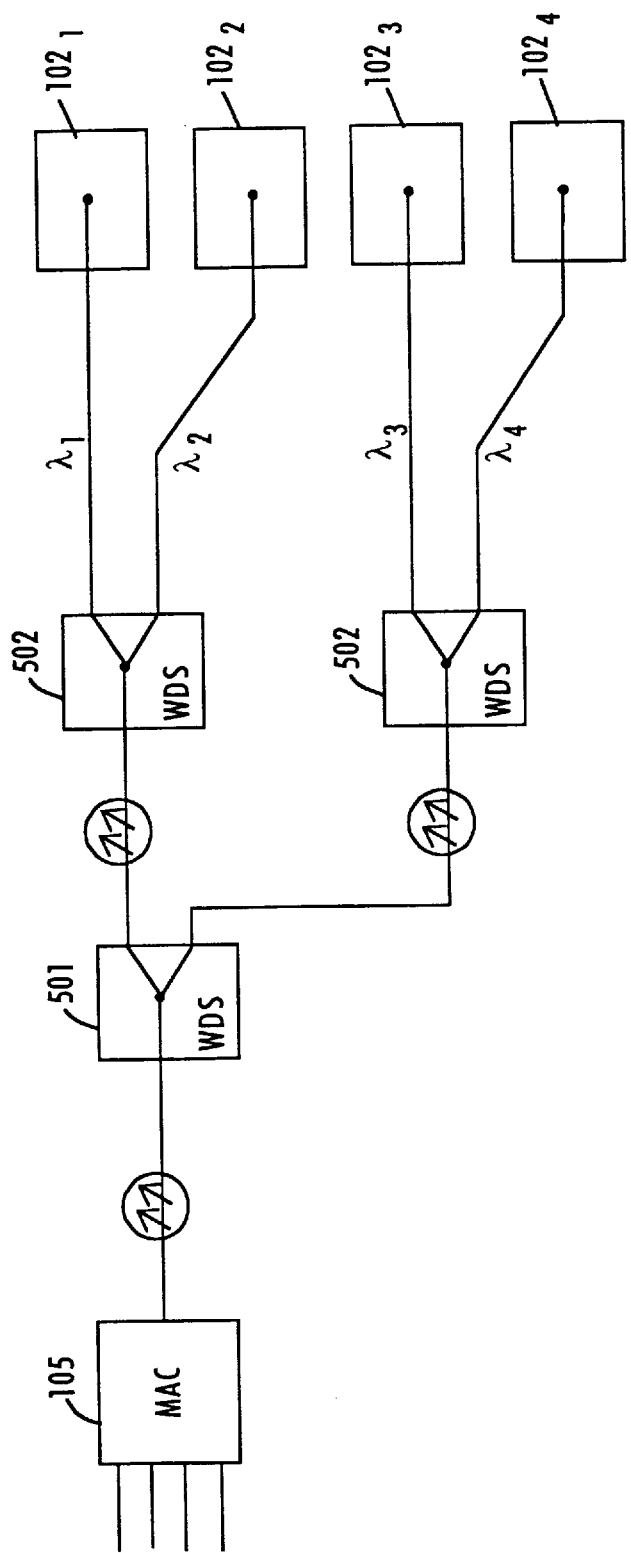
FIG. 5 is an illustrative diagram of wavelength routing employed in another embodiment of the invention.

A preferred embodiment for distribution (separation and routing) of the wavelength multiplexed signals is illustrated in FIG. 5. The optical transmitter 401 of MAC 105 is connected to the optical receiver in each one of a plurality of customer premises and transmits and receives, full duplex, a multiple number (n) of different wavelengths. A passive wavelength dependent splitter 501 receives the fiber optic signals from the optical tranmitter 401 and separates the transmitted optical signals by wavelength into two legs, thereby demultiplexing the wavelength division multiplexed optical signals according to wavelength. Each leg is input to another wavelength dependent splitter 502 which splits the leg into two wavelengths.

Each one of the separated wavelengths is forwarded to a corresponding CPE wherein it is received by one of the MAC's 1021 to 1024. The structure of the MAC's do not need to change in this distribution embodiment. The optical receiver is controlled to be responsive to the separated wavelength and the laser in the transmitter array which corresponds to the separated wavelength is selected and controlled for transmitting optical signals to MAC 105. Mulitplexing and demultiplexing no longer must be carried out by IID 101.

Sonet Network

Figure 6:
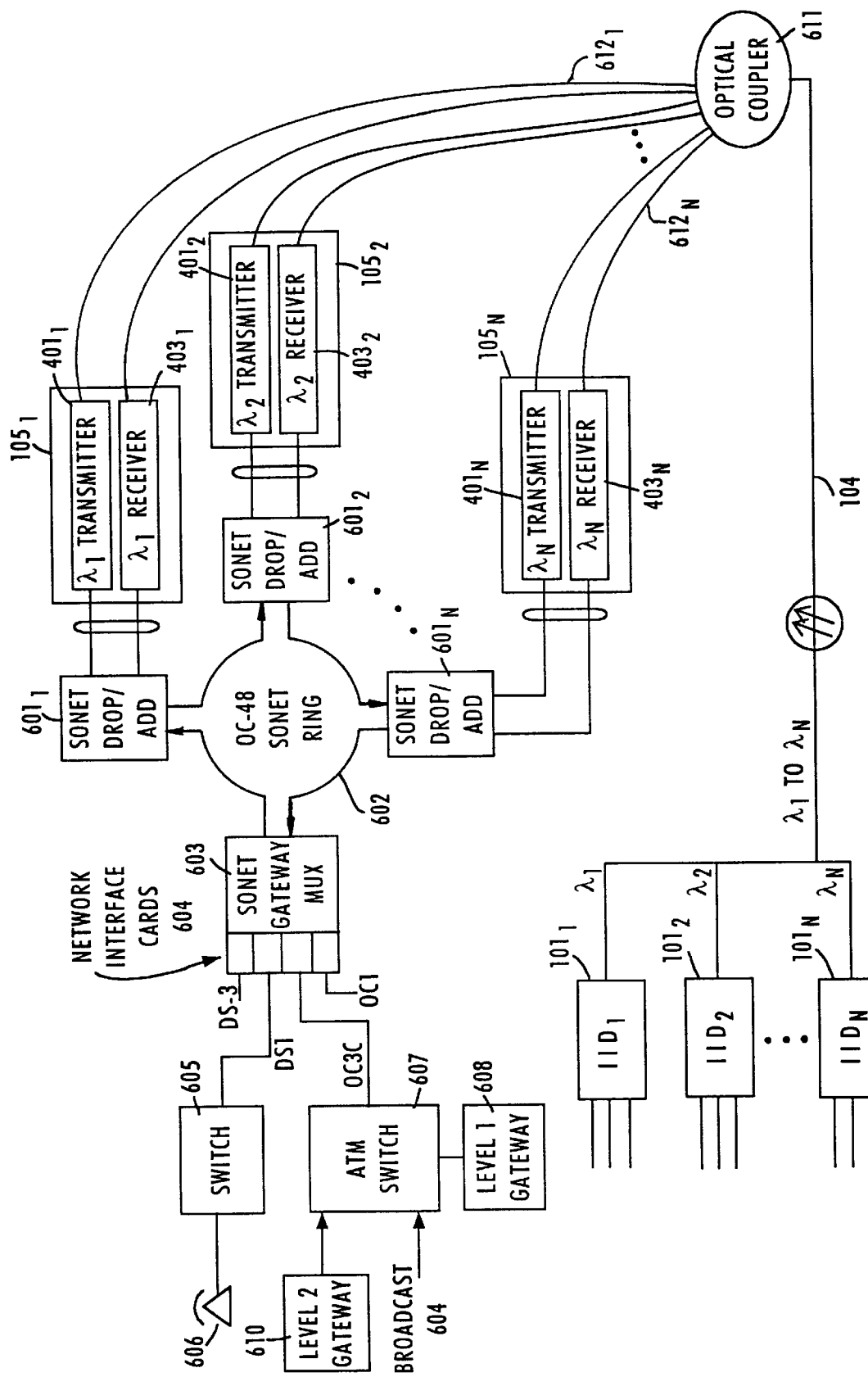
FIG. 6 is an illustrative diagram of a SONET optical network that may be optimally used with the dynamic bandwidth access procedure providing a plurality of services to the customer's premises.

A synchronous optical network (SONET), connected to the CPE according to the present invention and utilizing the intelligent interface device of FIG. 4, is shown in FIG. 6. The basic module or first level of the Synchronous Optical Network (SONET) signal is called the Synchronous Transport Signal-Level 1 (STS-1). The STS-1 has a bit rate of 51.84 Mb/sec and is synchronous. The STS-1 signal is formed from a sequence of repeating frames. The STS-1 frame is illustrated in FIG. 2 of U.S. Pat. No. 5,293,376. The STS-1 frame structure can be drawn as 90 columns by 9 rows of 8-bit bytes. The order of transmission of the bytes is row by row, from left to right across the columns, with one entire frame being transmitted every 125 micro-seconds. The 125 micro-second frame period supports digital voice signal transport encoded using 1 byte/125 micro-seconds= 64 kb/s. The first three columns of the STS-1 frame contain section and line overhead bytes. The remaining 87 columns form the STS-1 Synchronous Payload Envelope (SPE). The SPE carries SONET payloads including 9 bytes of path overhead. The STS-1 can carry a clear channel DS3 signal (44.736 Mb/s) or, alternatively, a plurality of lower-rate signals such as DS0, DS1, DS1C, and DS2 by dividing the Synchronous Payload Envelope into a plurality of fixed time slots. For example, 648 DS0 signals fit into the SPE of an STS-1 signal.

Higher rate SONET signals are obtained by byte interleaving N frame aligned STS-1 signals to form an STS-N signal in accordance with conventional SONET technology. An STS-N signal may be viewed as having a repetitive frame structure, wherein each frame comprises the overhead bits of N STS-1 frames and N synchronous payload envelopes. For example, three STS-1 signals may be multiplexed by a multiplexer into an STS-3 signal. The bit rate of the STS-3 signal is three times the bit rate of an STS-1 signal and the structure of each frame of the STS-3 signal comprises three synchronous payload envelopes and three fields of overhead bits from the three original STS-1 signals. When transmitted using optical fibers, the STS-N signal is converted to optical form and is designated as the OC-N signal. A more detailed description of SONET appears in U.S. Pat. No. 5,293,376.

The SONET network of FIG. 6 preferably comprises a plurality of fiber optic hubs $601_1$, $601_2$, to $601_N$ on the SONET network side of the fiber optic medium of ring 602. Each fiber optic hub can drop and add optical signals to and from the SONET ring 602. The SONET ring 602 may receive signals from a variety of input sources and distributes those signals through the media access controllers $105_1$ to $105_N$. In particular, the SONET network contains a SONET gateway multiplexer 603 having a plurality of network interface cards 604 for receiving a variety of inputs. For example, a narrowband switch 605 provides narrowband telephone communications from telephone network 606. An ATM switch 607, connected to SONET gateway multiplexer 603, couples ATM signals to and from ATM switch 607 on the SONET ring 602. The ATM switch 607 may be that disclosed in copending, commonly assigned, patent application Ser. No. 08/413,215 filed on Mar. 28, 1995 entitled "Full Service Network with Distributed Architecture", which is hereby incorporated by reference in its entirety.

These inputs to the gateway 603 preferably include narrowband transport for voice and narrowband data services. A digital switch or an analog implementation of a Service Switching Point (SSP) switch 605 provides standard type plain old telephone service (POTS) for telephone customers 606. The digital POTS switch provides a DS1 type digital input/output port through interfaces conforming to either TR008 or TR303. The DS1 goes directly to a SONET gateway multiplexer 603. The multiplexer may also receive telephone signals in DS1 format from an analog switch through a central office terminal. The central office terminal converts analog signals to digital and digital signals to analog as necessary to allow communication between the analog switch and the rest of the network.

The signals are made available at one of the SONET drop/add hubs 601 and wavelength multiplexed by the corresponding MAC 105 (possibly time division multiplexed with a number of DS1 signals) for transmission over one wavelength on the fiber optic transmission path 104 to IID's 101.

Figure 7:
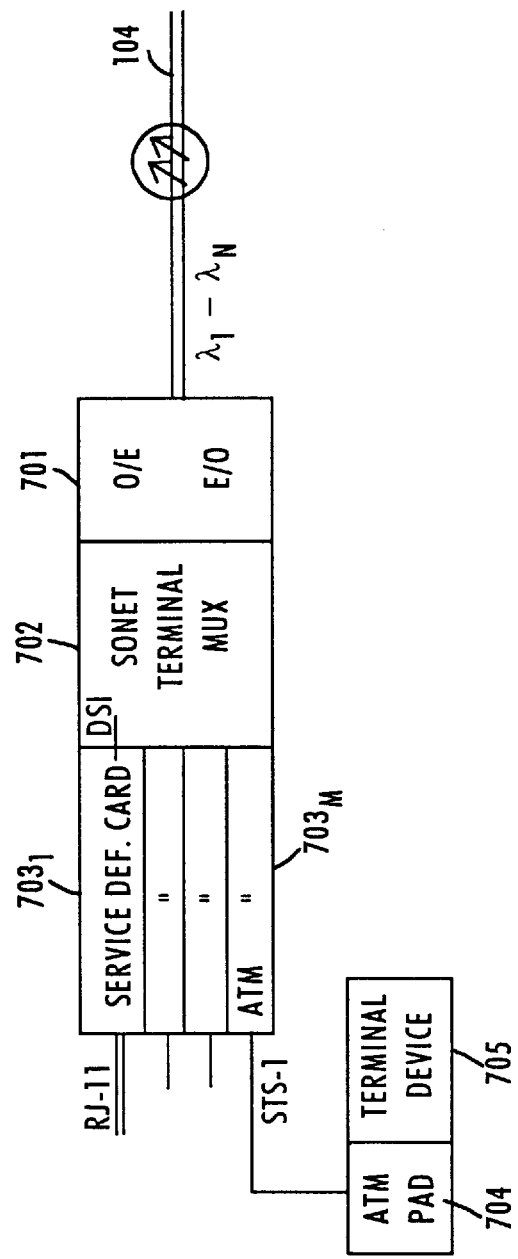
FIG. 7 shows the IID 101 of the SONET network embodiment of FIG. 6 in more detail.
Figure 8A:
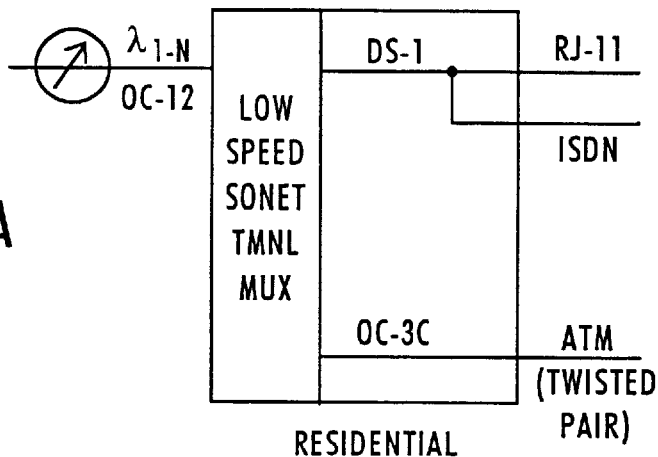
FIGS. 8A, 8B and 8C show exemplary CPE interfaces for residential, small business and large business customers, respectively.
Figure 8B:
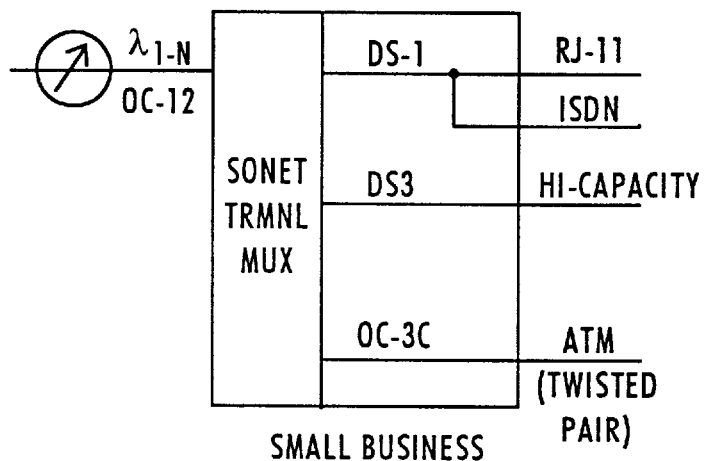
Figure 8C:
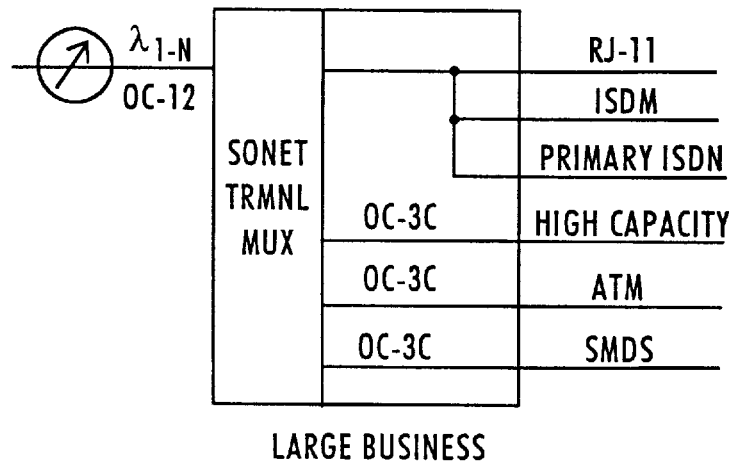

A preferred embodiment of the IID 101 for use in the SONET network of FIG. 6 is shown in FIG. 7. Each IID 101 preferably contains an optical interface 701 for two-way conversion, a SONET terminal multiplexer 702, and a plurality of service definition module cards $703_1$ to $703_M$. The SONET terminal multiplexer 702 preferably provides telephony service and complies with TA-TSY-000303, IDLC System Generic Requirements, Objectives and Interface: Feature Set C—SONET interface (Supplement 2) ; Bellcore, Issue 3, December 1987, hereby incorporated by reference. The standard protocol for MUX 702 to signal with SONET drop/add fiber hubs $601_1$ to $601_N$ and the functionality of MUX 702 are defined in TA-TSY-000253, SONET Transport Systems: Common Generic Criteria; Bellcore, Issue 5, February 1990. One of the service definition module cards provides ATM cells as output with STS-1 interface on twisted pair to an ATM Packet Assembler/Disassembler (PAD) 704 and a terminal device 705.

ATM switch 607 receives and outputs broadcast video signals 609 and/or video signals from a Level 2 Gateway 610 under the control of Level 1 Gateway 608. The ATM switch 607 uses known encoding technology to provide various network identifiers that take the service signals through the fiber optic network to corresponding broadband electrical devices at the customer premises. The Intelligent Interface Devices 101 which optically receive those service signals, convert them to electrical signals and deliver them to electrical devices in the customer premises.

Of course, the broadband SONET network shown in FIG. 6 may have any number of connected sources and end users and may deliver any type of, or any number of types of, broadband information. For example, it could also transmit digital multimedia information and the customer premises equipment could include a personal computer and computer monitor instead of, or in addition to, a DET and television. The broadband information is made available at one of the SONET drop/add hubs 601 and wavelength multiplexed by the corresponding MAC 105 (possibly time division multiplexed with a number of DS1 signals) for transmission over one wavelength fiber optic transmission path 104.

The dynamic media access control is done in three phases. As an illustrative example, consider a telephone call. A twisted pair connection is established to the interface device when a telephone goes off-hook. The MAC 102 in the interface 101 then negotiates with MAC 105 to obtain a bandwidth path for the voice on an assigned wavelength on fiber path 104. A channel is developed on a wavelength for the signaling communications of the dynamic media access control procedure carried out between each IID 101 and a corresponding MAC 105 using either an asynchronous optical protocol, or the synchronous (SONET) OC rate transport. The signaling information may be broadcast over all of the fiber optics couplings, $612_1$ to $612_N$, to optical coupler 611 in a time division multiplexed channel. In this case, each one of the IID's 101 is addressable and/or is assigned a predetermined time slot and includes means to selectively receive and decode the signalling data indicating the bandwidth allocation for that IID 101. The multiplexing and demulitplexing of the MAC 102 is carried out in accordance with the decoded data obtained and stored by the IID 101.

Each IID 101 includes means to receive selection signals from a user via remote control, direct entry or through the distribution network internal to the CPE. The IID responds by transmitting appropriate data signals over a narrowband signaling wavelength channel on the fiber optic transmission path 104 to the corresponding MAC 105. The MAC 105 is also addressable and/or assigned a time slot for signalling communications. If the data represents bandwidth request, wavelength request or bit rate request selection signals, the MAC 105 dynamically responds to that data by allocating bandwidth, wavelengths or bit rate connections as outlined above, and stores data identifying each subscriber's selections or preferences for subsequent communications.

The following execution of a narrowband telephone call is given as an example of the dynamic bandwidth allocation procedure. When a telephone set 111 goes off-hook a relay closes and current flows through the telephone and twisted wire pair 112. The intelligent interface device 101 recognizes this as an off-hook condition. In response, the interface 101 transmits a request for dial tone upstream over fiber 104, via some established signaling channel and predefined signaling protocol. If the bandwidth necessary for the telephone call is available on fiber 104, the interface at the central office or corresponding MAC 105 allocates a wavelength and a time slot on fiber 104 to the desired telephone call and transmits back a signaling message identifying the allocated wavelength and time slot to the interface device 101 at the customer premises. The interface at the central office concurrently establishes a connection to narrowband telephone switch 107. At this point, the fiber optic system has established a telephone grade link through from the telephone set 111 to the narrowband telephone switch 107, and the switch 107 can accept dialed digits and complete the call through the PSTN in the normal manner. Similar procedures are used to obtain broadband channels and associated signaling channels on fiber 104 and establish connections to appropriate broadband switching systems, such as broadband switch 108, to set up sessions with video information providers, e.g. for video on demand type services.

Although shown in the figures and frequently referred to as a house or other location, it is to be understood throughout this application that the customer premises may constitute any type of premises such as a school, an office, an apartment building, an office building, etc. The CPE may also be comprised of a plurality of premises, separated by a small distance such as a housing subdivision, a university campus, etc. The CO may be a telephone company central office containing other equipment and providing other services. Although shown and referred to as a central office, the CO may comprise any serving node which is geographically distant from the CPE.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

We claim:

1. A fiber optic communications network comprising:
   a telecommunications central office receiving and transmitting communications and information signals;
   a plurality of customer premises, each one of said customer premises having:
      an intelligent interface device receiving and transmitting said communications and information signals and performing wavelength division multiplexing and demultiplexing of said communications and information signals, and either one terminal device performing services requiring different bandwidth allocations or a plurality of terminal devices requiring different bandwidth allocations;

a fiber optic transmission path connecting said telecommunications central office to said intelligent interface device in said one customer premises, said telecommunications central office controllably transmitting optical signals corresponding to said communications and information signals to said one customer premises over said fiber optic transmission path and receiving optical signals from said one customer premises over said fiber optic transmission path; and a plurality of service definition modules in the intelligent interface device of each one of said plurality of customer premises, said service definition modules controlling said wavelength division multiplexing and demultiplexing of said communications and information signals so as to dynamically provide said different bandwidth allocations over said fiber optic transmission path connecting said telecommunications central office to said intelligent interface device in said customer premises.

2. A fiber optics communications network as recited in claim 1, wherein said fiber optic transmission path comprises a single full duplex optical fiber.

3. A fiber optics communications network as recited in claim 1, wherein said fiber optic transmission path comprises two simplex optical fibers.

4. A fiber optics communications network as recited in claim 1, wherein said telecommunications central office comprises a narrowband switch providing voice grade telephone service routing and a broadband switch providing routing for broadband services.

5. A fiber optics communications network as recited in claim 4, wherein said telecommunications central office further comprises an asynchronous transfer mode switch.

6. A fiber optics communications network as recited in claim 5, wherein said telecommunications central office transmits optical service signals containing network identifiers over said fiber optic transmission path; and wherein said intelligent interface device receives said optical service signals, converts said optical service signals into electrical signals and delivers the electrical signals to electrical devices in the customer premises in accordance with said network identifiers.

7. A fiber optics communications network as recited in claim 4, wherein said telecommunications central office further comprises an optical switch providing optical signals from an optical network.

8. A fiber optics communications network as recited in claim 1, wherein said optical signals corresponding to said communications and information signals from said telecommunications central office are transmitted simultaneously on at least three different wavelengths and said intelligent interface device contains an optical receiver for receiving at least two of said three different wavelengths.

9. A fiber optics communications network as recited in claim 1, wherein said optical signals corresponding to said communications and information signals from said telecommunications central office are transmitted simultaneously on at least three different wavelengths and said intelligent interface device performs format conversions of said optical signals corresponding to said communications and information signals from said telecommunications central office.

10. A fiber optics communications network as recited in claim 1, wherein the network has media access control functionality and said intelligent interface device performs a dynamic media access control procedure.

11. A fiber optics communications network as recited in claim 10, wherein said dynamic media access control procedure supplies individual services and dynamically provides said different bandwidth allocations upon demand by a customer.

12. A fiber optics communications network as recited in claim 8, wherein said different bandwidth allocations includes the dynamic allocation of said at least two of said three different wavelengths.

13. A fiber optics communications network as recited in claim 12, wherein said dynamic allocation of said at least two of said three different wavelengths is performed upon demand by said customer.

14. A fiber optics communications network as recited in claim 12, wherein said dynamic media access control procedure includes the dynamic allocation of bit rate upon demand by said customer.

15. A fiber optics communications network as recited in claim 1, wherein said network further comprises a SONET fiber optic ring connected to said telecommunications central office and receiving said communications and information signals, said SONET fiber optic ring having a plurality of drop/add fiber hubs, each one of said hubs being connected to at least one intelligent interface device.

16. A fiber optics communications network as recited in claim 10, wherein said intelligent interface device is addressable by said telecommunications central office.

17. A fiber optics communications network as recited in claim 10, wherein said intelligent interface device transmits a bandwidth request signal in response to user inputs.

18. A fiber optics communications network as recited in claim 17, wherein said user inputs are received from a remote control.

19. An intelligent optical interface device comprising:

an optical transmitter and an optical receiver, connected to at least one optical fiber, for two-way conversion between optical and electrical signals;

a media access controller for controlling the optical transmitter and the optical receiver so as to send and receive wavelength division multiplexed optical signals; and at least one service definition module for controlling said media access controller, wherein said at least one service definition module is responsive to signalling communications received over said optical fiber for controlling said wavelength dependent multiplexer and demultiplexer in accordance with said signalling communications.

20. An intelligent optical interface device as recited in claim 19, wherein said optical transmitter comprises an array of lasers, each one of said lasers operating at a predetermined wavelength, and wherein said at least one service definition module selects one or more of said lasers in accordance with said signalling communications.

21. An intelligent interface device as recited in claim 19, wherein said media access controller performs a dynamic media access control procedure in response to said signalling communications.

22. An intelligent interface device as recited in claim 21, wherein said dynamic media access control procedure includes the dynamic allocation of individual services upon demand by said customer.

23. An intelligent interface device as recited in claim 19, wherein said media access controller performs a dynamic media access control procedure which includes the dynamic allocation of a plurality of different wavelengths.

24. An intelligent interface device as recited in claim 23, wherein said dynamic allocation of said plurality of different wavelengths is performed upon demand by said customer.

25. An intelligent interface device as recited in claim 21, wherein said dynamic media access control procedure includes the dynamic allocation of bit rate upon demand by said customer.

26. A fiber optics communications network as recited in claim 19, wherein said intelligent interface device is addressable by said telecommunications central office.

27. A fiber optics communications network as recited in claim 19, wherein said intelligent interface device outputs a bandwidth request signal on said at least one optical fiber in response to user inputs.

28. A fiber optics communications network as recited in claim 27, wherein said user inputs are received from a remote control.

* * * * *